United States Patent [19]

Catanzarite

[11] 4,366,616

[45] * Jan. 4, 1983

[54] COATING FOR LITHIUM ANODE, THIONYL CHLORIDE ACTIVE CATHODE ELECTROCHEMICAL CELL

[76] Inventor: Vincent O. Catanzarite, 7044 Mira Vista, Las Vegas, Nev. 89120

[*] Notice: The portion of the term of this patent subsequent to Oct. 16, 1996, has been disclaimed.

[21] Appl. No.: 197,961

[22] Filed: Oct. 17, 1980

Related U.S. Application Data

[60] Division of Ser. No. 143,719, Apr. 25, 1980, Pat. No. 4,296,185, which is a continuation-in-part of Ser. No. 53,988, Jul. 2, 1979, abandoned, which is a continuation of Ser. No. 840,521, Oct. 11, 1977, Pat. No. 4,170,693.

[51] Int. Cl.³ .................................................. H01M 6/14
[52] U.S. Cl. .................................. 29/623.5; 29/623.1
[58] Field of Search .............. 429/48, 101, 194, 196, 429/199, 248, 249; 427/123, 245, 246; 29/623.1, 623.2, 623.5, 730

[56] References Cited

U.S. PATENT DOCUMENTS

| | | | |
|---|---|---|---|
| 3,993,501 | 11/1976 | Kalnoki-Kis | 429/48 |
| 4,020,240 | 4/1977 | Schlaikjer | 429/196 X |
| 4,170,693 | 10/1979 | Catanzarite | 29/623.1 X |
| 4,296,185 | 10/1981 | Catanzarite | 29/623.1 X |

*Primary Examiner*—Francis S. Husar
*Assistant Examiner*—Jonathan L. Scherer
*Attorney, Agent, or Firm*—Flehr, Hohbach, Test, Albritton & Herbert

[57] ABSTRACT

Electrochemical power cells having a cathode current collector, a combination liquid active cathode depolarizer electrolyte solvent and an anode that forms surface compounds when in intimate contact with the liquid cathode are enhanced by the addition of a passivation limiting film contiguous to said anode. The passivating film is a member of the cyanoacrilate family of organic compounds.

6 Claims, No Drawings

COATING FOR LITHIUM ANODE, THIONYL CHLORIDE ACTIVE CATHODE ELECTROCHEMICAL CELL

CROSS REFERENCE TO RELATED APPLICATIONS

This is a division of application Ser. No. 143,719 filed Apr. 25, 1980 now U.S. Pat. No. 4,296,185 granted Oct. 20, 1981 which is a continuation-in-part of application Ser. No. 53,988 filed on July 2, 1979, now abandoned, which is in turn a continuation of application Ser. No. 840,521 filed on Oct. 11, 1977 now U.S. Pat. No. 4,170,693 granted Oct. 9, 1979.

BACKGROUND OF THE INVENTION

This invention relates to electrochemical cells and batteries. More particularly, it relates to lithium anode, thionyl chloride active cathode depolarizer cells and the use of additive films to enchance their performance.

The recent growth in portable electronic products requiring electrochemical power cells for energy has highlighted the deficiencies of existing power cells for demanding applications. In an effort to improve the electrochemical cell technology, much attention has been given to perfecting what is generally referred to as lithium batteries. More precisely, this means electrochemical cells using a highly reactive anode such as lithium in combination with varying cathode and electrolyte materials. The interest in this cell technology stems from a recognition that such cells theoretically provide higher energy densities, higher voltages, wider temperature operating ranges, longer shelf lives, and lower cost.

Among all the known combinations of anodes with different cathodes and electrolytes, those believed to have among the highest energy density and current delivery capability use alkaline anodes and certain inorganic liquids as the active cathode depolarizer. This type of cell chemistry is commonly referred to as liquid cathode. The use of a liquid as an active cathode depolarizer is a radical departure from conventional cell technology. Until recently, it was generally believed that the active cathode depolarizer could never directly contact the anode. However, it has recently been discovered that certain active cathode materials do not react chemically to any appreciable extent with an active anode metal at the interface between the metal and the cathode material, thereby allowing the cathode material to contact the anode directly.

Early liquid cathode cells use liquid sulfur dioxide active cathode depolarizer and are described in U.S. Pat. No. 3,567,515 issued to Maricle, et al. on Mar. 2, 1971. Since sulfur dioxide is not a liquid at room temperature and at atmospheric pressure, it proved to be a difficult chemistry with which to work.

A major step forward in the development of liquid cathode cells was the discovery of a class of inorganic materials, generally called oxyhalides, that are liquids at room temperature. These materials perform the function of active cathode depolarizer. Additionally, they may also be used as the electrolyte solvent. Liquid cathode cells using oxyhalides are described in U.S. Pat. No. 3,926,669 issued to Auborn on Dec. 16, 1975 and in British Pat. No. 1,409,307 issued to Blomgren, et al. on Oct. 18, 1975. At least one of the oxyhalides, thionyl chloride ($SOCL_2$), in addition to having the general characteristics described above, also provides substantial additional energy density and current delivery capability when used in conjunction with a lithium anode.

The liquid cathode systems, however, have suffered from two major problems that have prevented their wide spread use. First, they can be dangerous under certain circumstances, and secondly, high current rate batteries could not be made with good long term storage characteristics.

The first of these problems is addressed by U.S. Pat. No. 4,167,608 issued Sep. 11, 1979 and assigned to the same assignee as the present application.

The second problem is the subject of the present application. This problem manifests itself in two principal ways. First, there is a voltage delay after storage at elevated temperatures. That is, after cells have been stored at temperatures exceeding room temperatures, the cell voltage under moderate discharge loads requires some period of time, running between several seconds and several hours, to approach the level it would have instantly achieved prior to storage. Secondly, cells that can reliably deliver high current rates (for example 7 milliamperes per square centemeter of anode surface area or better) are difficult to achieve. Taken together, these two problems are generally referred to as the passivation phenomena.

Studies have indicated that passivation results from a buildup of compounds on the surface of the anode. These compounds are not presentally well understood; however, it is generally believed that they are the product of a reaction between the anode and one of more of the following: the electrolyte solvent, the electrolyte solute, or impurities.

If cells are assembled carefully, passivation can be minimized in fresh batteries. However, storage, particularly at elevated temperatures, causes passivation to occur rapidly.

Others have attempted to solve the passivation problem in a variety of ways. One approach was to partially discharge cells prior to storage. A second approach was to increase the roughness factor of the anode by etching prior to assembly. A third approach was to pretreat the cathode current collector to eliminate impurities. Other approaches including the introduction of certain inorganic material such as water and sulfur dioxide have also been tried. However, to date, all known approaches have made little impact on the passivation problem.

It is therefore an object of this invention to reduce the passivation phenomenon in liquid cathode cells.

It is another object of the invention to provide an improvement in voltage delays for lithium anode, liquid cathode cells.

It is another object of the invention to provide improved current rate delivery capability for lithium anode, liquid cathode cells.

It is yet another object of this invention to reduce passivation in lithium anode, thionyl chloride cells.

Finally, it is an object of this invention to provide improved storage characteristics for lithium anode, liquid cathode cells.

SUMMARY OF THE INVENTION

The basis of this invention is th discovery that the application of certain films to the anode or separator material substantially mitigates the passivation problem. According to this invention, passivation in an electrochemical cell having a reactive metal anode in combination with a liquid cathode such that compounds tend to form on the surface of said anode are reduced by a coating positioned contiguous to the anode that interacts with the cell chemistry to inhibit the formation of compounds on the anode while allowing lithium ions to pass therethrough. In particular, organic coompounds that cure from a liquid to an adherent film may be applied to the anode and or separator prior to assembly. In lithium anode, thionyl chloride cathode depolarizer cells, the class of organic compounds known as cyanoacrylics may be used.

DETAILED DESCRIPTION OF PREFERRED EMBODIMENTS

The anode is preferably lithium or alloys of lithium. Other useful anode materials would generally be consumable metals such as alkali metals or alkali earth metals and alloys and or compounds of such metals that form passivation layers when incorporated in an electrochemical cell with a liquid cathode.

The electrolyte solvent which is also the cathode depolarizer is preferably thionyl chloride. Other useful electrolyte solvents are oxyhalides of elements of Group V and VI of the periodic table. Some examples are given in Table I of the Blomgren patent.

The electrolyte solute may be simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent employed and that it yield a solution which is ionically conductive. According to the Lewis or electronic concept of acids and bases, many substances which contain no active hydrogen can act as acids or acceptors or electron doublets. In U.S. Pat. No. 3,542,602 it is suggested that the complex or double salt formed between a Lewis acid and ionizable salt yields an entity which is more stable than either of the components alone.

Typical Lewis acids suitable for use in the present invention include aluminum chloride, antimony pentachloride, zirconium tatrachloride, phosphorus pentachloride, boron fluoride, boron chloride and boron bromide.

Ionizable salts useful in combination with the Lewis acids include lithium floride, lithium chloride, lithium bromide, lithium sulfide, sodium flouride, sodium chloride, sodium bromide, potassium flouride, potassium chloride and potassium bromide.

The double salts formed by a Lewis acid and an inorganic ionizable salt may be used as such or the individual components may be added to the solvent separately to form the salt. One such double salt, for example, is that formed by the combination of aluminum chloride and lithium chloride to yield lithium aluminum tetrachloride.

In addition to an anode, active cathode depolarizer and ionically conductive electrolyte, these cells require a cathode current collector.

Generally any compatible solid which is substantially electrically conductive and inert in the cell can be used as a cathode current collector since the function of the collector is to permit external electrical contact to be made with the active cathode material. It is desirable to have as much surface contact as possible between the liquid cathode and the current collector. Therefore, a porous material is preferred since it will provide a high surface area interface with the liquid cathode material. The current collector may be metallic and may be present in any physical form such as metallic film, screen or a pressed powder. Examples of some suitable metal current collectors are provided in Table II of the Auborn Patent. The current collector may also be partly or completely of carbon.

Electrical separation of current collector and anode is required to insure that cathode or anode reactions do not occur unless electrical current flows through an external circuit. Since the current collector is insoluble in the electrolyte and the anode does not react spontaneously with the electrolyte, a mechanical seperator may be used. Materials useful for this function are described in the Auborn Patent.

Although the varied cells described in the Blomgren and Auborn Patents are feasible, and the present invention is applicable thereto, much of the recent interest is in the lithium anode, thionyl chloride cell. As mentioned previously, this interest is a result of this cell's apparent ability to provide greater energy density and current delivery capability than other liquid cathode systems. Yet even though thionyl chloride cells have proven to be the best performers among the liquid cathode systems, their performance still suffers from passivation.

The following examples and tables illustrate the improvement the present invention makes to cells using thionyl chloride as the active cathode depolarizer. These examples and data are given as examples only and are not intended to in any way limit the invention.

All of the following examples were manufactured in the same way and are as close to identical as practical except for the specific chemical coating that are the subject of this invention and the specific manner in which these coatings are applied to cell components.

The examples are button type cells having a stainless steel can measuring 0.880 inches outside diameter and 0.150 inch maximum height and having a nominal internal volume of 0.035 cubic inches. The anode is a single disk of lithium 0.680 inches in diameter by 0.020 inches in thickness. The separator is a commercially available inorganic paper. The current collector is principally carbon. The electrolyte is a 1.4 molar solution of lithium aluminum tetrachloride in thionyl chloride. The cell is hermetically sealed by a high quality ceramic-to-metal seal. To the basic cell described above, a variety of coatings were introduced. The basic manufacturing process involves a straight forward assembly of components by conventional means. The coatings are most conveniently applied to particular components prior to assembly. Immediately after assembly, cells containing coatings may exhibit a higher internal impedance than cells without coating. This phenomenon is eliminated by a "burn-in" procedure which consists of exposing the cells with coating to elevated temperatures for a certain period of time. The temperature and duration of exposure are interdependent, and must be determined emperically for each coating. This may be simply accomplished by monitoring the internal impedance of sample cells over time at some suitable temperature. Generally speaking there is an inverse relationship between exposure time and the temperature to which the cells are exposed. Each of the following examples describes a particular coating, its method of application and burn in procedure.

EXAMPLE 1

A thin layer of methyl cyanoacrylate is placed on both sides of the lithium disk an allowed to harden prior to assembly. This chemical is a thin liquid prior to curing and may be applied in any way that yields a thin uniform coating. To aid in applying a thin uniform coating, the material may be diluted with methyl ethyl ketone. After assembly, cells are "burned in" for approximately twelve hours at 71 C.

EXAMPLE 2

In this example, methyl cyanoacrylate is placed on the separator material only and allowed to dry prior to assembly. A preferable method of application is dipping. After assembly, cells are burned in for approximately twelve hours at 71 C.

EXAMPLE 3

In this example methyl cyanoacrylate is applied to both the lithium anode and the separator material and allowed to harden prior to assembly. After assembly, cells are burned in for approximately 12 hours at 71 C.

EXAMPLE 4

In this example, methyl cyanoacrylate is applied to the lithium and allowed to harden prior to assembly. After assembly, the batteries are baked out at 71 C. for approximately 48 hours.

EXAMPLE 5

In this example, ethyl cyanoacrylate is applied to the separator material only and allowed to harden prior to assembly. After assembly, the batteries are baked out at 71 C. for approximately 48 hours.

EXAMPLE 6

In this example, ethyl cyanoacrylate is applied to both the anode and the separator material and allowed to harden prior to assembly. After assembly, the cells are baked out at 71 C. for approximately 48 hours.

TEST PROCEDURE

A substantial quantity of cells of each example were manufactured and tested. The test procedure was the same for all cells in all examples. Immediately after burn in, cells are discharged to measure initial life. The discharge rate is 10 milliamperes; the test temperature is 25 C.; and the cutoff voltage for determining service life is 2.4 volts. After burn in, cells are moved on a periodic basis and their service life measured as described above. In addition voltage delay is measured. The results of these tests are given in Table I below. Sample C is a control sample having no coating.

TABLE I

VOLTAGE DELAY AND LOSS OF LIFE AFTER ELEVATED TEMPERATURE STORAGE

| SAMPLE | DAYS AT 71 C. TO 50% OF LIFE | SECONDS TO REACH 2 VOLTS ON 60 OHM LOAD AFTER STORAGE AT 71 C. FOR: | | | |
|---|---|---|---|---|---|
| | | 1 DAY | 3 DAYS | 8 DAYS | 21 DAYS |
| C | 2 | never | never | never | never |
| 1 | 12 | less than 1 | less than 1 | 5 | 20 |
| 2 | 12 | less than 1 | less than 1 | 5 | 20 |
| 3 | 12 | less than 1 | less than 1 | 5 | 20 |
| 4 | | less than 1 | less than 1 | 2 | 10 |
| 5 | 28 | less than 1 | less than 1 | 2 | 10 |
| 6 | 28 | less than 1 | less than 1 | 2 | 10 |

The coatings achieve best results when applied to both the lithium disc and to the separator. The next best results are achieved by applying the coating to the lithium disc only. The next best results are achieved by applying the coating to the separator only. The three foregoing application procedures although differing in result among themselves are vastly superior to the absence of any coating or the addition of coating to the electrolyte material only. Accordingly, a preferred location for antipassivating coatings is the anode and the separator material.

The coating materials are either liquid at room temperature or can be dissolved in a liquid carrier. Application may be made by dipping, spraying or spinning in the case of disc shaped anodes. After application of the liquid, the coating material is allowed to harden prior to cell assembly. The hardening process is actually a polymerizing process that occurs within minutes after application at room temperature.

The following examples were constructed in the same manner as examples 1–6 but were burned in at 50° C. for 24 hours and stored at 50° C. for extended periods.

Cells were tested at room temperature with a 60 ohm, 3 watt, 1% resistor and the time in seconds was measured for each cell to reach 2 volts. Each cell was tested after 1 day, after 8 days, and after 30 days. Several cells were made and tested for each example. The test results of a typical cell for each example is put forth in Table II.

EXAMPLE 7

In this example, methyl cyanoacrylate is applied to both sides of the lithium anode disc and to the separator material and allowed to harden prior to assembly. After assembly, cells are burned in at 50° C. for 24 hours.

EXAMPLE 8

In this example, ethyl cyanoacrylate is applied to both sides of the lithium anode disc and to the separator material and allowed to harden prior to assembly. After assembly, cells are burned in at 50° C. for 24 hours.

EXAMPLE 9

In this example, propyl cyanoacrylate is applied to both sides of the lithium anode disc and the separator material and allowed to harden prior to assembly. After assembly, cells are burned in at 50° C. for 24 hours.

EXAMPLE 10

In this example, isobutyl cyanoacrylate is applied to both sides of the lithium anode disc and the separator material and allowed to harden prior to assembly. After assembly, cells are burned in at 50° C. for 24 hours.

EXAMPLE 11

This example is a control example and uses no antipassivation coating material. Otherwise its manufacture, in burn-in and test procedure were identical with 7 through 10.

TABLE II
VOLTAGE DELAY AFTER ELEVATED TEMPERATURE STORAGE

| Example | Acrylate Coating | Seconds to Reach 2 Volts after Storage for: | | |
|---|---|---|---|---|
| | | 1 day | 8 days | 30 days |
| 7 | methyl | 1.7 | 3.2 | 3.9 |
| 8 | ethyl | .3 | 1.7 | 3.3 |
| 9 | propyl | .3 | 2.7 | 4.8 |
| 10 | isobutyl | never below | 3.2 | 40 |
| 11 | none | never below | never above | never above |

Although the foregoing samples form the cyanoacrilate film on the anode disc or on the separator, there are alternative ways to form the film. For example, the cyanoacrilate film may be formed by spreading the non polymerized liquid onto a flat teflon surface and allowing polymerization to occur thereon. Since cyanoacrilates do not adhere to teflon, a thin sheet of cyanoacrilate may be peeled off of the teflon. It may then be cut to the proper shape and inserted in the cell next to and in physical contact with the anode. With this production method, as with the others previously described, the electrolyte must pass through the cyanoacrilate surface to reach the anode material.

I Claim:

1. In a method of reducing passivation in an electrochemical cell having a lithium anode, a cathode current collector spaced from said anode, a separator located between said anode and cathode, and an ionically conductive electrolyte consisting of a solution of ionically conductive solute dissolved in thionyl chloride; the steps comprising:
    (a) prior to assembly, coating said anode with a liquid compound that cures to an adherent film, said compound chosen from the cyanoacrylate family;
    (b) prior to assembly, coating said separator with said liquid compound;
    (c) curing said liquid compound to form an adherent film on said anode and separator;
    (d) assembling said anode and separator into said cell along with said cathode current collector and electrode.

2. The method as described in claim 1, said method further characterized by burning in said cell.

3. The method according to claim 2 wherein said burn is conducted for a period of 24 hours at 50° C.

4. In a method of reducing passivation in an electrochemical cell having a lithium anode, a cathode current collector spaced from said anode, a separator located between said anode and said cathode current collector, and electroylte consisting of an ionically conductive solute dissolved in thionyl chloride; the steps comprising:
    (a) prior to assembly, locating a cyanoacrilate sheet adjacent to said anode
    (b) assembling said anode and cyanoacrilate sheet into said cell along with said cathode current collector and electrolyte.

5. The method of claim 4 further characterized by the step of burning in said cell after assembly.

6. The method of claim 5 wherein said burning is conducted at 50° C. for 24 hours.

* * * * *